2,914,566
ORGANIC FLUORINE COMPOUNDS

Murray Hauptschein, Montgomery County, Milton Braid, Philadelphia, and Francis E. Lawlor, Montgomery County, Pa., assignors to Pennsalt Chemicals Corporation, a corporation of Pennsylvania No Drawing. Application March 15, 1957
Serial No. 646,202

10 Claims. (Cl. 260—608)

This invention relates to certain new organic compounds containing both fluorine and sulfur.

The desirability of introducing fluorine into organic compounds has been recognized. In general, the presence of fluorine gives much greater chemical and thermal stability than would be present in analogous compounds not containing fluorine. Such properties are highly desirable in many industrial applications; as, for example, in high pressure lubricants.

It has now been found that certain secondary fluorinated organic iodides can be reacted with sulfur to give a series of branched chain polysulfides which are useful in high pressure gear lubrication and as cutting oils. In another aspect of the invention it has been discovered that certain of these polysulfides may be reacted with chlorine to give fluorine-containing sulfenyl chlorides which are useful as additives for high pressure gear lubricants and as fungicides.

The fluorinated polysulfides to which the present invention is directed have the general formula $$R_f[CF_2—CFY]_n—S_x—[CFY—CF_2]_nR_f$$

where the $R_f$ substituents are selected from the class consisting of chlorine, fluorine and halogenoalkyl groups free from iodine and preferably having not more than about 6 carbon atoms; where the Y substituents are selected from the class consisting of chloroalkyl, fluoroalkyl and fluorochloroalkyl groups preferably having not more than about 3 carbon atoms; where the $n$ symbols represent numbers from 1 to about 10 and where $x$ is from 2 to about 5. Preferably $R_f$ and Y are perfluoroalkyl or perfluorochloroalkyl groups having, in the case of $R_f$, not more than about 6 carbon atoms and, in the case of Y, not more than about 3 carbon atoms.

It will be understood that the invention includes compounds where the two $R_f$ substituents are the same or different; where the two Y substituents are the same or different; and where the two $n$'s are the same or different.

As used in this application a "halogenoalkyl" group is a substituted alkyl group containing halogen and carbon. It may also contain hydrogen.

A "chloroalkyl" group means a substituted alkyl group containing chlorine and carbon. It may also contain hydrogen.

A "fluoroalkyl" group means a substituted alkyl group containing fluorine and carbon. It may also contain hydrogen.

A "fluorochloroalkyl" group means a substituted alkyl group containing fluorine, chlorine and carbon. It may also contain hydrogen.

A "perfluoroalkyl" group means a substituted alkyl group containing only fluorine and carbon.

A "perfluorochloroalkyl" group is a substituted alkyl group containing only fluorine, chlorine and carbon.

Compounds of the type described are prepared, in accordance with the invention, by reacting secondary fluorinated iodides of the general formula $$R_f[CF_2CFY]_nI$$

where $R_f$, Y and $n$ have the values given above, with sulfur.

Among the secondary iodides to which the invention is applicable the following may be cited as exemplary:

$$C_3F_7[CF_2CF(CF_3)]_{1-5}I$$
$$CF_2ClCF(CF_3)[CF_2CF(CF_3)]I$$
$$CF_2ClCF(CF_3)[CF_2CF(CF_2Cl)]_2I$$
$$CHF_2CF_2[CF_2CF(CHF_2)]_3I$$
$$CHFClCF_2[CF_2CF(CF_3)]_3I$$
$$CHFClCF_2[CF_2CF(CHF_2)]_2I$$
$$CF_2Br[CF_2CF(CF_3)]_2I$$
$$CF_3[CF_2CF(CF_2Cl)]I$$
$$C_3F_7[CF_2CF(CHF_2)]_2I$$
$$CHF_2CF_2[CF_2CF(CF_3)]_3I$$
$$C_3F_7[CF_2CF(CF_3)]_{10}I$$
$$CF_2ClCF(CF_3)[CF_2CF(CF_3)]_{10}I$$

The reaction is, in general, conducted at a temperature between about 150° C. and about 300° C., preferably between about 160° C. and about 200° C. Pressure is not a critical factor. In general it will be between atmospheric and about 10,000 p.s.i.g. Time of reaction is again not critical and may be from a matter of say ten minutes to several days. The proportion of sulfur used will depend to some extent upon the amount of sulfur it is desired to have in the final product. Generally between about two and about 20 mols of sulfur (S) will be present, per mol of iodide.

In carrying out the invention any suitable technique may be employed. Conveniently, the ingredients are simply put into a suitable vessel, such as a stainless steel or Monel autoclave or a glass vessel, in an inert atmosphere, and heated to the required temperature with stirring. In certain cases, particularly when the secondary iodide is a solid, it may be desirable to use an inert solvent, such as a fluorochloroalkane, as the reaction medium. Alternatively, the reaction may be carried out by passing the reactants through a heated tube.

As pointed out above, the novel polysulfides are intermediates for the preparation of novel sulfenyl chlorides having the general formula $$R_f'[CF_2CFZ]_nSCl$$

where $R_f'$ is selected from the class consisting of chlorine, fluorine, perfluoroalkyl and perfluorochloralkyl groups preferably having not more than about 6 carbon atoms; where Z is selected from the class consisting of perfluoroalkyl and perfluorochloroalkyl groups having preferably not more than about 3 carbon atoms; and where $n$ is from 1 to about 10. In accordance with the invention these compounds are made by reacting polysulfides of the type $$R_f[CF_2CFZ]_n—S_x—[CFZCF_2]_nR_f'$$

where $R_f'$, Z and $n$ and $x$ have the values given above, with chlorine. This reaction is preferably conducted at a temperature between about 20° C. and about 250° C., usually between about 50° C. and about 150° C. Pressure is not critical and will normally be from atmospheric to about 10,000 p.s.i.g. Reaction time is again not critical and may range from say 10 minutes to several days. Chlorine should be present in proportions ranging from about 1 to about 10 mols (Cl₂) per mol of polysulfide.

Again, the particular manipulation technique by means of which the reaction is carried out is not important. Conveniently the polysulfide is put into a pressure vessel with the required amount of chlorine and heated to reaction temperature. Alternatively, the reaction can be carried out by passing the chlorine and polysulfide through a hot tube.

The invention will be further described with reference to the following specific examples, it being understood that these examples are given for purposes of illustration only and are not to be taken as in any way limiting the invention beyond the scope of the appended claims.

EXAMPLE I

*The reaction of 2-iodoperfluorohexane with sulfur*

Forty-eight grams (0.108 mole) of 2-iodoperfluorohexane and 33.5 g. of sublimed sulfur were charged into a 300 ml. Monel autoclave under a dry nitrogen atmosphere. The sealed autoclave was heated in a shaker at 172°–176° C. for 112 hours. The autoclave was cooled to room temperature and vented in vacuo to a Dry Ice-cooled trap. No volatile material was collected in this trap. From the autoclave was drained an oil shown to be $[C_4F_9CF(CF_3)]_2S_x$, red in color due to a small amount of dissolved iodine, boiling point 87° C. (8 mm.)–ca. 103° C. (0.1 mm.). Only 0.9 g. (0.003 mole) of 2-iodoperfluorohexane was recovered, and 41 g. of a hard "stick" of a mixture of sulfur and iodine was collected.

Careful rectification of the 30 g. of crude oil collected gave the pure compounds shown in the table below. Based on the determined average value of 3 for $x$ in $[C_4F_9CF(CF_3)]_2S_x$, the conversion was 76% and the yield was 78%.

PERFLUORO-2-HEXYL POLYSULFIDES

| $[C_4F_9CF(CF_3)]_2S_x$ x value | B.P. | | $n_D^t$ | t., °C. | Analysis, percent | | | |
|---|---|---|---|---|---|---|---|---|
| | | | | | Carbon | | Sulfur | |
| | °C. | Mm. | | | Calc. | Found | Calc. | Found |
| 2 | 94 | 8 | 1.3300 | 23 | 20.5 | 20.4 | 9.1 | [1] 9.6 |
| 3 | 66 | <0.1 | 1.3469 | 28.8 | 19.6 | 19.5 | 13.1 | 12.8 |
| 4 | ca. 80 | <0.1 | 1.3791 | 20 | 18.8 | 19.2 | 16.7 | 16.7 |
| 5 | Residue (viscous oil). | | 1.3975 | 19.5 | 18.1 | 18.0 | 20.1 | 19.6 |

[1] Analysis.—Calcd. for $C_{12}F_{26}S_2$: F, 70.34. Found: 70.7.

EXAMPLE II

The procedure of Example I was repeated in a sealed Pyrex tube at 180° C. for 75 hours with similar results.

EXAMPLE III

*The reaction of $C_3F_7[CF_2CF(CF_3)]_nI$ with sulfur*

By a procedure similar to Example I, the products $C_3F_7[FC_2CF(CF_3)]_n$—$S_x$—$[CF(CF_3)CF_2]_nC_3F_7$ where $n=2$–$5$ and $x=2$–$5$ are formed from the corresponding telomer iodides, $C_3F_7[CF_2CF(CF_3)]_nI$ where $n=2$–$5$.

The componud where $n=2$ and $x=2.5$ average is an oily material which is useful for lubricating the bearings of laboratory stirring apparatus.

EXAMPLE IV

The compounds $CF_2ClCF(CF_3)[CF_2CF(CF_3)]_{1-5}I$ are heated at 180° F. with a 10 molar excess of sulfur, using the general technique of Example I. Products having the formula $CF_2ClCF(CF_3)[CF_2CF(CF_3)]_{1-5}$
$S_{2-5}[(CF)_3CFCF_2]_{1-5}(CF_3)CFCF_2Cl$ are obtained.

EXAMPLE V

In a heavy-wall Pyrex ampule (volume 70 cc.), a mixture of 4.2 g. (0.059 mole) of chlorine and 8 g. (0.011 mole) of perfluoro-2-hexyl polysulfide $[C_4F_9CF(CF_3)]_2S_x$ where $x=2.5$ av. was sealed and heated for 125 hours at 105° C. The tube was cooled and opened, and then warmed to room temperature to remove unreacted chlorine. The remaining mixture was carefully fractionated. A total of 6.6 g. (0.017 mole) of perfluoro-2-hexylsulfenyl chloride, $C_4F_9CF(CF_3)SCl$, a pale yellow liquid, was obtained; middle cut, boiling point 63–63.8° C. at 97 mm., $n_D^{26}$ 1.3237.

*Anal.*—Calcd. for $C_6ClF_{13}S$: C, 18.6; Cl, 9.2. Found: C, 18.8; Cl, 8.9.

The compound had ultraviolet absorption maxima (in isooctane) at 213.5 mμ (strong) and at 340 mμ (weak). Further distillation effected the recovery of 1.1 g. of unreacted polysulfide. The conversion to the sulfenyl chloride was 77% and the yield was 89% of theory.

EXAMPLE VI

Following the procedure of Example V, the compound $C_3F_7[CF_2CF(CF_3)]_5S_{2.5}$av.$[(CF_3)CFCF_2]_5C_3F_7$ is reacted with four times the stoichiometric amount of chlorine to give the compound $C_3F_7[CF_2CF(CF_3)]_5SCl$. A mixture of this compound and the product of Example III (where $n=2$ and $x=2.5$ av.) is useful for lubricating the bearings of laboratory stirring apparatus.

EXAMPLE VII

Following the procedure of Example V, $CF_2ClCF(CF_3)[CF_2CF(CF_3)]_2$—S—S—
$[(CF_3)CFCF_2]_2(CF_3)CFCF_2Cl$ is reacted with a 5 molar excess of chlorine ($Cl_2$) at 120° C. for two hours to give $CF_2ClCF(CF_3)[CF_2CF(CF_3)]_2SCl$ From the foregoing description it will be observed that the present invention provides a simple, convenient process for making organic compounds containing both fluorine and sulfur. The oily materials obtained in Examples I through IV are useful in cutting oils, particularly where $x$ is 3 to 5. They are also useful as extreme pressure lubricant additives, for example, in the lubrication of hypoid gears. The sulfenyl chlorides of Examples V through VII may be used in extreme pressure lubricants where they act as anti-wear additives. They also have fungicidal properties.

What is claimed is:

1. Compounds having the formula

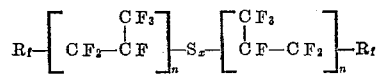

where the $R_f$ substituents are selected from the class consisting of chlorine, fluorine, and halogenoalkyl groups free from iodine having not more than about 6 carbon atoms; where $x$ is from 2 to about 5; and where the $n$ symbols represent numbers from 1 to about 10.

2. A method for making compounds of the formula

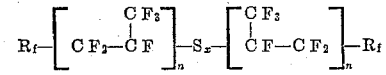

where the $R_f$ substituents are selected from the class consisting of chlorine, fluorine and halogenalkyl groups free from iodine having not more than about 6 carbon atoms;

where $x$ is from 2 to about 5; and where the $n$ symbols represent numbers from 1 to about 10; which comprises reacting a secondary iodide having the formula:

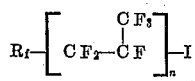

with sulfur.

3. The compounds claimed in claim 1 wherein at least one of the $R_f$ substituents is a perfluoroalkyl group having not more than about 6 carbon atoms.

4. The compounds claimed in claim 1 wherein at least one of the $R_f$ substituents is a perfluorochloroalkyl group having not more than about 6 carbon atoms.

5. Compounds having the formula $$C_3F_7[CF_2CF(CF_3)]_n-S_x[CF(CF_3)CF_2]_nC_3F_7$$

where the $n$ symbols represent numbers from 1 to about 10 and $x$ is from 2 to about 5.

6. Compounds having the formula

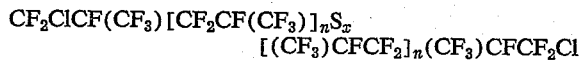

where the $n$ symbols represent numbers from 1 to about 10 and $x$ is from 2 to about 5.

7. The method claimed in claim 2 wherein $R_f$ is a perfluoroalkyl group having not more than about 6 carbon atoms.

8. The method claimed in claim 2 wherein $R_f$ is a perfluorochloroalkyl group having not more than about 6 carbon atoms.

9. A method for making compounds of the formula $$C_3F_7[CF_2CF(CF_3)]_n-S_x-[CF(CF_3)CF_2]_nC_3F_7$$

where the $n$ symbols represent numbers from 1 to about 10 and $x$ is 2 to about 5, which comprises reacting $$C_3F_7-[CF_2CF(CF_3)]_n-I$$

with sulfur.

10. A method for making compounds of the formula

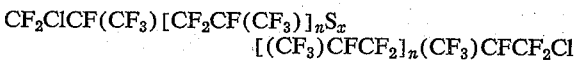

where the $n$ symbols represent numbers from 1 to about 10 and $x$ is from 2 to about 5, which comprises reacting $$CF_2ClCF(CF_3)-[CF_2CF(CF_3)]_n-I$$

with sulfur.

References Cited in the file of this patent
UNITED STATES PATENTS

| | | |
|---|---|---|
| 2,451,411 | Raasch | Oct. 12, 1948 |
| 2,484,061 | Wood | Oct. 11, 1949 |
| 2,545,285 | Kamlet | Mar. 13, 1951 |
| 2,560,421 | Eby | July 10, 1951 |
| 2,695,316 | McBride | Nov. 23, 1954 |

UNITED STATES PATENT OFFICE
CERTIFICATE OF CORRECTION

Patent No. 2,914,566                                  November 24, 1959

Murray Hauptschein et al.

It is hereby certified that error appears in the printed specification of the above numbered patent requiring correction and that the said Letters Patent should read as corrected below.

Column 3, line 52, the formula should appear as shown below instead of as in the patent:

$$C_3F_7\left[CF_2CF(CF_3)\right]_n-S_x-\left[CF(CF_3)CF_2\right]_nC_3F_7$$

Signed and sealed this 31st day of May 1960.

(SEAL)
Attest:

KARL H. AXLINE                                   ROBERT C. WATSON
Attesting Officer                                  Commissioner of Patents